(12) United States Patent
Seong

(10) Patent No.: US 9,780,342 B2
(45) Date of Patent: Oct. 3, 2017

(54) CURVED SECONDARY BATTERY

(71) Applicant: SAMSUNG SDI CO., LTD., Yongin-si, Gyeonggi-do (KR)

(72) Inventor: Jae-II Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 200 days.

(21) Appl. No.: 14/307,016

(22) Filed: Jun. 17, 2014

(65) Prior Publication Data

US 2015/0207110 A1 Jul. 23, 2015

(30) Foreign Application Priority Data

Jan. 20, 2014 (KR) ........................ 10-2014-0006739

(51) Int. Cl.
| | |
|---|---|
| *H01M 2/02* | (2006.01) |
| *H01M 2/04* | (2006.01) |
| *H01M 2/30* | (2006.01) |
| *H01M 10/052* | (2010.01) |
| *H01M 10/058* | (2010.01) |

(52) U.S. Cl.
CPC ....... *H01M 2/0202* (2013.01); *H01M 2/0404* (2013.01); *H01M 2/0456* (2013.01); *H01M 2/30* (2013.01); *H01M 10/052* (2013.01); *H01M 10/058* (2013.01); *H01M 2002/0205* (2013.01); *H01M 2220/30* (2013.01)

(58) Field of Classification Search
CPC .... H01M 2/0217; H01M 2/0473; H01M 2/12; H01M 10/0436; H01M 10/647; H01M 10/52
See application file for complete search history.

(56) References Cited

U.S. PATENT DOCUMENTS 6,977,124 B2 * 12/2005 Probst .................... A61N 1/375
429/163
2003/0017390 A1 1/2003 Probst et al.
(Continued)

FOREIGN PATENT DOCUMENTS

| | | |
|---|---|---|
| CN | 202495544 U | 10/2012 |
| DE | 10 2011 006 225 A1 | 10/2012 |

(Continued)

OTHER PUBLICATIONS

EPO Search Report dated Jun. 15, 2015, for corresponding European Patent application 14194267.2, (5 pages).

(Continued)

*Primary Examiner* — Nicholas P D'Aniello
*Assistant Examiner* — Abibatu Ojo-Amoo
(74) *Attorney, Agent, or Firm* — Lewis Roca Rothgerber Christie LLP

(57) ABSTRACT

A curved secondary battery may include a can having an opening, an electrode assembly accommodated in the can, and a cap plate coupled to the can. The cap plate may include a concave first side surface and a parallel convex second side surface, and a first surface and a second surface that connect the first and second side surfaces. The first surface may include a first groove extending along a lengthwise direction of the cap plate and positioned closer to the first side surface than to the second side surface.

17 Claims, 5 Drawing Sheets

(56) References Cited

U.S. PATENT DOCUMENTS

| | | | |
|---|---|---|---|
| 2008/0107962 A1* | 5/2008 | Uh | H01M 2/0404 |
| | | | 429/164 |
| 2012/0040214 A1* | 2/2012 | Kim | H01M 2/1241 |
| | | | 429/56 |
| 2012/0214054 A1 | 8/2012 | Yoon | |
| 2013/0308282 A1 | 11/2013 | Shin et al. | |

FOREIGN PATENT DOCUMENTS

| | | |
|---|---|---|
| JP | 2013-107117 | 6/2013 |
| KR | 10-1233459 | 2/2013 |

OTHER PUBLICATIONS

English machine translation of Japanese Publication No. JP 2013-107117, dated Jun. 6, 2013, 29 pages.

\* cited by examiner

CURVED SECONDARY BATTERY

CROSS-REFERENCE TO RELATED APPLICATION

This application claims priority to and the benefit of Korean Patent Application No. 10-2014-0006739, filed on Jan. 20, 2014, in the Korean Intellectual Property Office, the entire disclosure of which is incorporated herein by reference.

BACKGROUND

1. Field

Aspects of the present invention relate to a curved secondary battery.

2. Description of the Related Art

Unlike primary batteries that cannot be recharged, secondary batteries can be repeatedly charged and discharged, and are, thus, more widely used due to their economic feasibility and eco-friendliness. Recently, the types of electronic devices in which secondary batteries are used have been diversified, and designs thereof are an important factor when users consider buying these electronic devices.

For example, a variety of technologies and applications including a wearable computer using a secondary battery as its power source have been developed and released, and electronic devices such as mobile phones and laptop computers are ergonomically designed to have a predetermined curvature. Accordingly, the secondary battery for operating these types of electronic devices needs to be formed to have a certain curvature to accommodate the shapes of these electronic devices.

SUMMARY

One or more embodiments of the present invention relate to a curved secondary battery.

According to one or more embodiments of the present invention, a curved secondary battery includes a can, an electrode assembly accommodated in the can, and a cap plate coupled to the can. The cap plate may include a concave first side surface and a parallel convex second side surface, and a first surface and a second surface that connect the first and second side surfaces. The first surface may include a first groove extending along a lengthwise direction of the cap plate and positioned closer to the first side surface than to the second side surface.

The first groove may be parallel to the first side surface and the second side surface.

The first groove may be inset approximately 0.25 millimeters (mm) to approximately 0.5 mm from the first side surface.

A depth of the first groove may be approximately one third to approximately one half of a distance between the first surface and the second surface.

Each end portion of the first groove may include a slope part.

A depth of the first groove may decrease at each end portions along the slope parts.

The first groove may be discontinuous.

The first surface of the cap plate may further include a second groove that is parallel to the first groove, and the second groove may be positioned closer to the second side surface than the first side surface.

The cap plate may further include an anchor protruding from the second surface toward the electrode assembly, and an insulating plate positioned at a bottom surface of the cap plate. The insulating plate may include an anchor groove configured to receive the anchor.

The anchor groove may be larger than the anchor.

The curved secondary battery may further include a terminal plate positioned at a bottom surface of the insulating plate; and an electrode pin inserted from the first surface. The electrode pin may penetrate the cap plate and the insulating plate, and may be coupled to the terminal plate.

According to one or more embodiments of the present invention, a curved secondary battery includes a can, an electrode assembly accommodated in the can and including a first electrode plate, a second electrode plate, and a separator between the first electrode plate and the second electrode plate, and a cap plate coupled to the can. The can may have a curvature, and the cap plate may have a concave first side surface and a convex second side surface having the same curvature as the can, and may further include a first surface and a second surface connecting the first and second side surfaces. The first surface may be at an exterior surface of the cap plate and may include a first groove extending along a lengthwise direction of the cap plate. The first groove may be inset from the first side surface approximately 0.25 mm to approximately 0.5 mm.

A depth of the first groove may be approximately one third to approximately one half of a thickness of the cap plate.

Each end portion of the first groove may include a slope part.

The first groove may be discontinuous.

The first surface of the cap plate may further include a second groove that parallel to the first groove, and the second groove may be inset approximately 0.25 mm to approximately 0.5 mm from the second side surface.

The curved secondary battery may further include an insulating plate and a terminal plate positioned at a bottom surface of the cap plate, and an electrode pin inserted from the first surface of the cap plate and coupled to the terminal plate by penetrating the cap plate and the insulating plate.

The curved secondary battery may further include a first electrode tab coupled to the cap plate and a second electrode tab coupled to the terminal plate. The first electrode tab may further be coupled to the first electrode plate and the second electrode tab may further be coupled to the second electrode plate.

The cap plate may further include an anchor protruding from the second surface in a direction toward the electrode assembly, and the insulating plate may define an anchor groove configured to receive the anchor.

The anchor groove may be larger than the anchor.

Additional aspects of the present invention will be set forth in part in the description which follows and, in part, will be apparent to those skilled in the art from the description, or may be learned by practice of the presented embodiments.

BRIEF DESCRIPTION OF THE DRAWINGS

These and/or other aspects of embodiments of the present invention will become apparent and more readily appreciated from the following description of the embodiments, taken in conjunction with the accompanying drawings in which.

DETAILED DESCRIPTION

Figure 1:
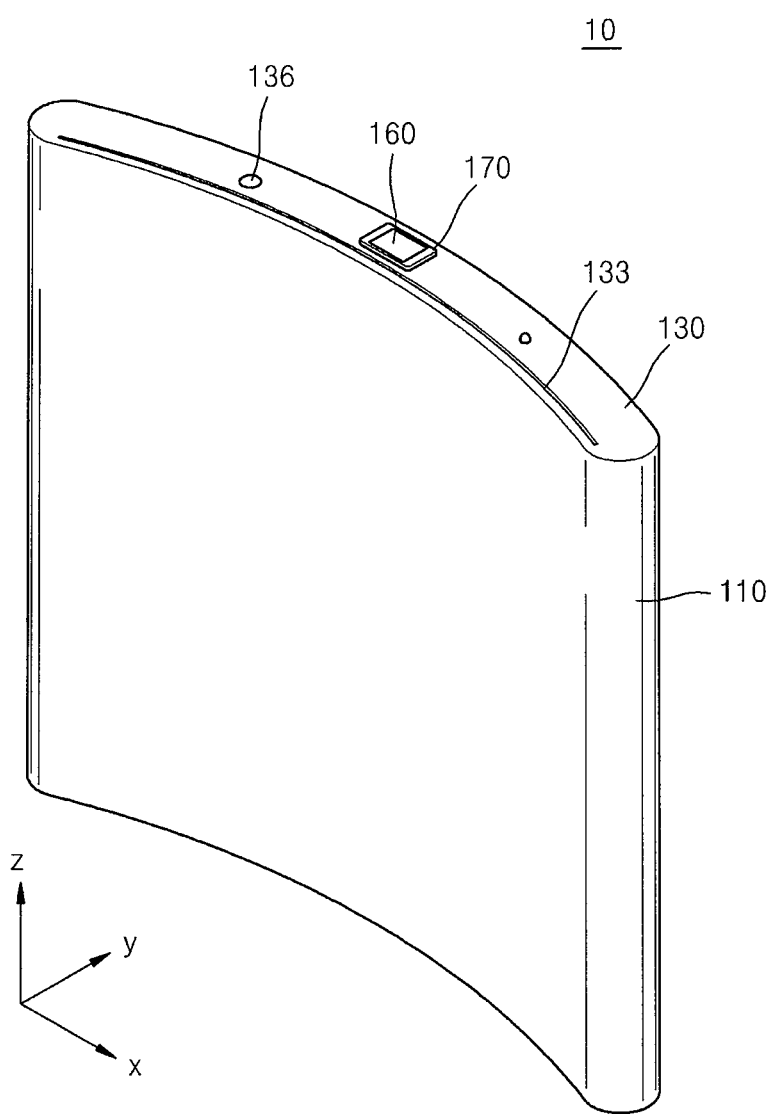
FIG. 1 is a perspective view of a curved secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, expressions such as "at least one of," when preceding a list of elements, modify the entire list of elements and do not modify the individual elements of the list.

It will be understood that although the terms "first" and "second" are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

The terminology used herein is for the purpose of describing particular embodiments only and is not intended to be limiting. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof.

Hereinafter, aspects of the present invention will be described in detail by explaining various embodiments of the invention with reference to the attached drawings. Like reference numerals in the drawings denote like elements, and thus, their description will not be repeated.

Figure 2:
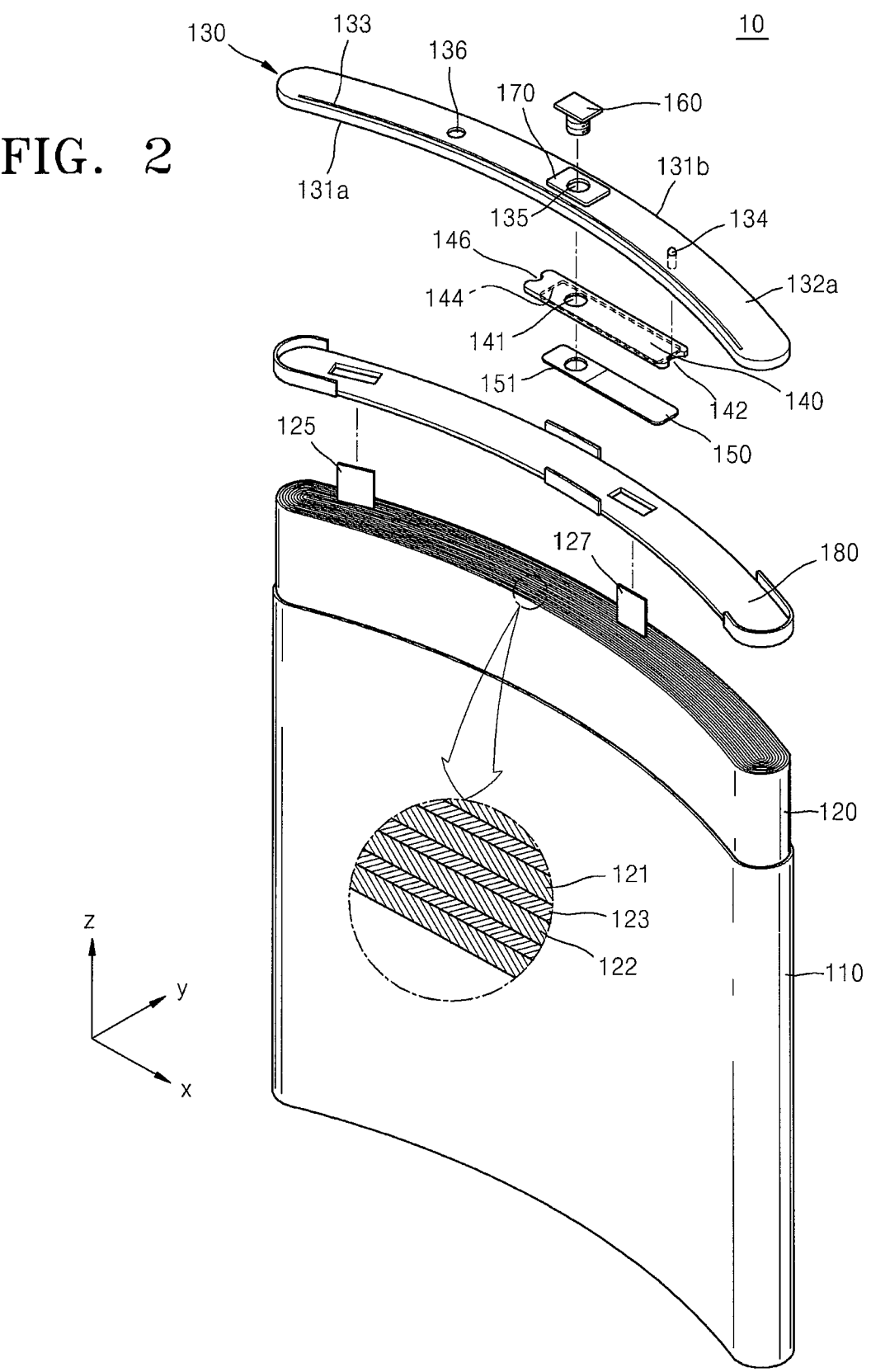
FIG. 2 is a partially exploded perspective view showing a cap plate of the curved secondary battery of FIG. 1.
Figure 3:
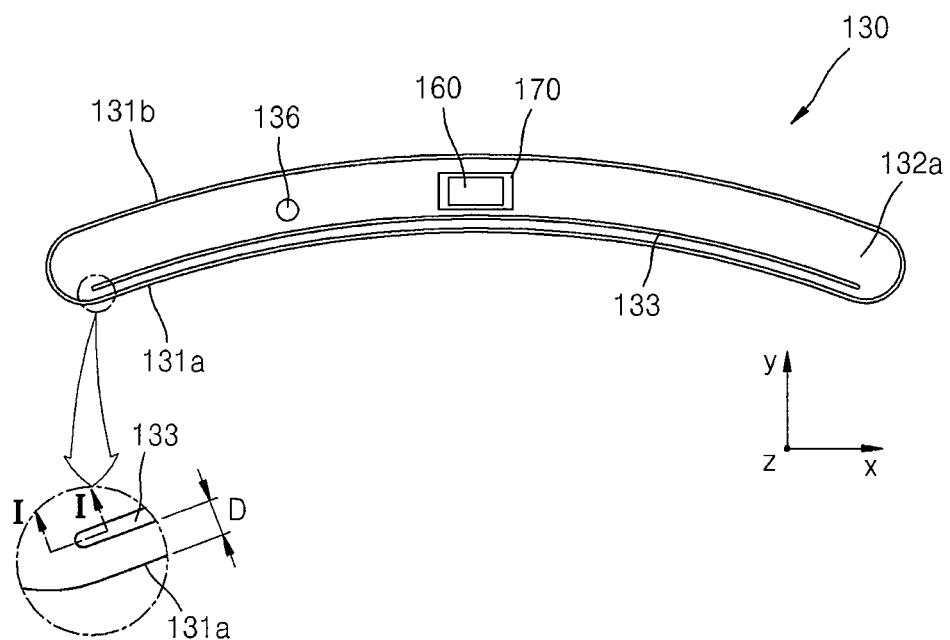
FIG. 3 is a plan view of the cap plate of the curved secondary battery of FIG. 1.
Figure 4:
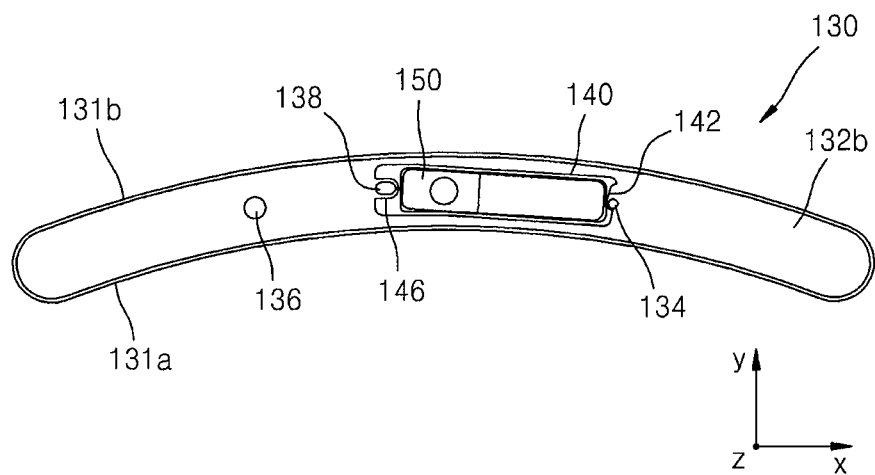
FIG. 4 is a bottom plan view of the cap plate of the curved secondary battery of FIG. 1.
Figure 5:
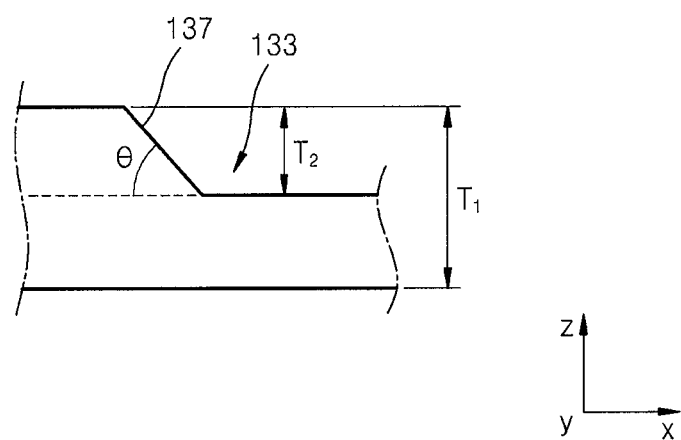
FIG. 5 is a schematic cross-sectional view of part of the curved secondary battery taken along the line I-I of FIG. 3.

FIG. 1 is a perspective view of a curved secondary battery 10 according to an embodiment of the present invention, FIG. 2 is a partially exploded perspective view showing a cap plate 130 of the curved secondary battery 10 of FIG. 1, FIG. 3 is a plan view of the cap plate 130 of the curved secondary battery 10 of FIG. 1, FIG. 4 is a bottom plan view of the cap plate 130 of the curved secondary battery 10 of FIG. 1, and FIG. 5 is a schematic cross-sectional view of part of the curved secondary battery 10 taken along the line I-I of FIG. 3.

Referring to the embodiments shown in FIGS. 1 through 5, the curved secondary battery 10 may include a can 110 having an opening at one end, an electrode assembly 120 housed inside the can 110, and the cap plate 130 coupled to the one end of the can 110.

The can 110, according to an embodiment, has an opening at one end to house the electrode assembly 120. The opening, according to an embodiment, may have a certain curvature, and the can 110 also may have a certain curvature defining the curved exterior of the curved secondary battery 10. The can 110, in this embodiment, may be formed of an aluminum or an aluminum alloy. As such, the can 110, according to these embodiments, may protect the electrode assembly 120 from an external impact, and may function as a heat dissipation plate emitting any heat generated while charging or discharging the electrode assembly 120.

In an embodiment, the electrode assembly 120 may include a first electrode plate 121, a second electrode plate 122, and a separator 123 between the first and second electrode plates 121 and 122. The electrode assembly 120, according to an embodiment, may be manufactured by sequentially stacking the first electrode plate 121, the separator 123, and the second electrode plate 122, and winding the stacked members, for example, in a jelly-roll shape. In another embodiment, the electrode assembly 120 may be manufactured by sequentially stacking the first electrode plate 121, the separator 123, and the second electrode plate 122, repeating the sequence a plurality of times.

In these embodiments, the first electrode plate 121 may be any one of an anode film or a cathode film. In an embodiment where the first electrode plate 121 is an anode film, the second electrode plate 122 may be a cathode film. On the contrary, in an embodiment where the first electrode plate 121 is a cathode film, the second electrode plate 122 may be an anode film. Accordingly, the first and second electrode plates 121 and 122, according to these embodiments, have different electrical polarities, and are not limited to a certain polarity. Hereinafter, in the embodiments described below, for convenience of explanation, it will be assumed that the first electrode plate 121 is an anode film and the second electrode plate 122 is a cathode film.

The first electrode plate 121, in this embodiment, may include a first active material portion which is coated with a first active material, and a first non-coated portion which does not include the first active material. In this embodiment, the first active material portion, for example, may be manufactured by coating a portion of at least one surface of an aluminum plate with the first active material, the remaining surfaces of the aluminum plate which are not coated with the first active material forming the first non-coated portion. The first active material, according to these embodiments, may be an anode active material. For example, in an embodiment, the first active material may be a lithium-containing transition metal oxide such as $LiCoO_2$, $LiNiO_2$, $LiMnO_2$, $LiMnO_4$, or a lithium chalcogenide compound.

The second electrode plate 122, according to these embodiments, may include a second active material portion which is coated with a second active material, and a second non-coated portion which does not include the second active material. In these embodiments, the second active material portion, for example, may be manufactured by coating a portion of at least one surface of a copper plate with the second active material, the remaining surfaces of the copper plate which are not coated with the second active material forming the second non-coated portion. The second active material, according to these embodiments, may be a cathode active material, for example, in an embodiment, carbon materials such as crystalline carbon, amorphous carbon, a carbon composite, or carbon fibers, lithium metal, or a lithium alloy.

The separator 123, according to an embodiment, may be a porous polymer membrane such as a polyethylene film or a polypropylene film, and the separator 123 may be a woven fabric or a non-woven fabric including polymer fibers. In some embodiments, the separator 123 may also include ceramic particles, and may be formed of solid polymer electrolytes. The separator 123 may be a separate film, or may be a non-conductive porous layer formed on the first or second electrode plate 121 or 122. In an embodiment, the separator 123 electrically separates the first electrode plate 121 and the second electrode plate 122, but the shape of the separator 123, according to these embodiments, is not necessarily the same as that of the first electrode plate 121 or the second electrode plate 122.

In these embodiments, a first electrode tab 125 and a second electrode tab 127 electrically connect the electrode assembly 120 to an external device. Thus, according to an embodiment, the first electrode tab 125 may be electrically connected to the first electrode plate 121, and the second electrode tab 127 may be electrically connected to the second electrode plate 122. In particular, the first electrode tab 125, in this embodiment, may be connected to the first non-coated portion, for example, by welding, etc., and the second electrode tab 127 may be connected to the second non-coated portion, for example, by welding, etc.

The cap plate 130, according to an embodiment, seals the opening of the can 110. The cap plate 130, in an embodiment, may be formed of a metal material such as aluminum or an aluminum alloy, and may be the same material as that of the can 110, such that a portion where the cap plate 130 and the can 110 are in contact may be coupled together, for example, by laser welding, etc. In an embodiment, the cap plate 130 may also first be coupled to a separate insulating case 180, the can 110 by then being coupled to the can 110 at its opening, as described above.

Since the opening of the can 110 in an embodiment may have a certain curvature, and the cap plate 130 may seal the opening, a shape of the cap plate 130 may also have a certain corresponding curvature. In particular, the cap plate 130, according to an embodiment, may have a concave first side surface 131a and a convex second side surface 131b that are parallel to each other, and the first and second side surfaces 131a and 131b may have substantially the same curvature as the opening of the can 110.

In addition, the cap plate 130, according to embodiment, may include a flat first surface 132a and a flat second surface 132b that connect the first and second side surfaces 131a and 131b. The first surface 132a, in this embodiment, may be oriented to face an exterior of the curved secondary battery 10, and the second surface 132b, in this embodiment, may be oriented to face the electrode assembly 120.

In an embodiment, the first surface 132a may include first groove 133. The first groove 133, in this embodiment, may extend along a lengthwise direction of the cap plate 130. In this embodiment, the cap plate 130 has a relatively smaller thickness (i.e. is thinner) as compared with the remainder of the cap plate 130 such that when an external impact is applied to the curved secondary battery 10, deformation occurs first in the first groove 133, which absorbs at least a portion of the external impact. Therefore, according to these embodiments, an explosion, ignition, etc. of the curved secondary battery 10, which may result from an external impact, etc., may be prevented or reduced, and thus safety of the curved secondary battery 10 may be improved.

In an embodiment, the first groove 133 may be closer to the first side surface 131a than the second side surface 131b. The curved secondary battery 10, according to these embodiments, may be formed flat and then contoured within a jig having a certain curvature by applying pressure to match the desired curvature of the final curved secondary battery 10. In these embodiments, during application of pressure, the first side surface 131a of the cap plate 130 may be under contraction stress while a shape of the first side surface 131a is concavely contoured, and the second side surface 131b may be under expansion stress while being convexly contoured. In this embodiment, when the first groove 133 is located closer to the first side surface 131a than the second side surface 131b, the contraction stress applied to the first side surface 131a may be relived due to deformation of the first groove 133 allowing the curved secondary battery 10 to be manufactured using reduced pressure and improving the efficiency of manufacturing the curved secondary battery 10.

The first groove 133, according to these embodiments, may minimize heat loss by preventing transmission of heat towards a center portion of the cap plate 130 when the cap plate 130 and the can 110 are coupled. Accordingly, a depth of an area where the cap plate 130 and the can 110 are coupled, for example melt-bonded by welding, may be increased, therefore increasing weldability between the cap plate 130 and the can 110, and increasing the strength of the coupling between the cap plate 130 and the can 110.

In an embodiment, the first groove 133 may be inset from the first side surface 131a, for example 0.25 millimeter (mm) to about 0.5 mm. When a distance D between the first groove 133 and the first side surface 131a is less than 0.25 mm, a welding area between the first groove 133 and the first side surface 131a is reduced, and may result in the mechanical strength and sealing force of the cap plate 130 and the can 110 to also be reduced. However, when the distance D between the first groove 133 and the first side surface 131a is greater than 0.5 mm, the weldability between the cap plate 130 and the can 110 may not see significant improvement.

In an embodiment, a depth T2 of the first groove 133 may be less than a distance from the first surface 132a to the second surface 132b of the cap plate 130, and may be, for example, one third to one half this distance. In other words, the depth T2 of the first groove 133, according to an embodiment, may be one third or one half of a thickness T1 of the cap plate 130.

When the depth T2 of the first groove 133 is less than a third of the thickness T1 of the cap plate 130, in embodiments where the cap plate 130 and the can 110 are welded together, it may be difficult to reduce a heat transfer coefficient while welding the cap plate 130 and the can 110. In addition, when an external impact is applied or when the curved secondary battery 10 is manufactured, a deformation-leading effect of the first groove 133 in examples where the depth T2 of the first groove 133 is less than a third of the thickness T1 of the cap plate 130, may be small.

On the contrary, when the depth T2 of the first groove 133 is greater than half of the thickness T1 of the cap plate 130, the strength of the cap plate 130 may decrease, and, thus, the cap plate 130 may be deformed while coupling the cap plate 130 to the can 110.

In an embodiment, both end portions of the first groove 133 may include slope parts 137. The slope parts 137, in this embodiment, may form a certain angle (θ) with the first surface 132a or the second surface 132b, and the depth T2 of the first groove 133 may decrease toward the end portions due to the slope parts 137. Therefore, in this embodiment, while the cap plate 130 and the can 110 are coupled in parallel to the first groove 133, a discontinuous change of the heat transfer coefficient in an area where the first groove 133 ends may be prevented at these slope parts 137, and the weldability may be improved.

The first groove 133, according to these embodiments, may function as a safety vent that is fracturable to provide a gas discharge path when a pressure in the can 110 exceeds a certain level. Since the first groove 133, according to some embodiments, is thinner than the cap plate 130, the first groove 133 may fracture first and function as the safety vent.

The cap plate 130, in an embodiment, may separately include a safety vent. For example, in an embodiment, the safety vent may be defined within the first groove 133. In an embodiment where the safety vent is within the first groove 133, a thickness of the safety vent may be relatively less than that of the first groove 133, such that the safety vent may sensitively react to an internal pressure of the can 110, improving the safety of the curved secondary battery 10.

The cap plate 130, in an embodiment, may include an electrolyte inlet 136. An electrolyte may be injected into the can 110 through the electrolyte inlet 136 after the cap plate 130 is coupled to the can 110, and the electrolyte inlet 136 may be sealed after the injection of the electrolyte is completed, according to this embodiment.

In an embodiment, an insulating plate 140 and a terminal plate 150 may be positioned at a bottom of the cap plate 130. The insulating plate 140, according to this embodiment, may be formed of an insulating material and may prevent a short circuit between the terminal plate 150 and the cap plate 130.

In an embodiment, the cap plate 130 may include an anchor 134 that protrudes towards the electrode assembly 120 from the second surface 132*b*, and the insulating plate 140 may include an anchor groove 142 in which the anchor 134 may be inserted. The anchor groove 142 may be coupled to the anchor 134, and may prevent dislocation of the insulating plate 140, according to an embodiment.

A size of the anchor groove 142, according to an embodiment, may be larger than a size of the anchor 134. In particular, the anchor groove 142, in this embodiment, may extend in a direction of curvature of the curved secondary battery 10 such that when the curved secondary battery 10 is manufactured by application of pressure, the anchor 134 and the anchor groove 142 may remain coupled although the anchor 134 may move relative to the curved cap plate 130 and the anchor groove 142 is on the insulating plate 140.

In an embodiment, the cap plate 130 may further include a coupling tip 138 that protrudes towards the electrode assembly 120 from the second surface 132*b*, and the insulating plate 140 may further include a coupling groove 146 configured to correspond with the coupling tip 138.

The terminal plate 150, according to an embodiment, is positioned within a setting groove 144 defined in the insulating plate 140. The terminal plate 150, according to an embodiment, may be formed of a nickel (Ni) alloy, and an end of the terminal plate 150 may be electrically connected to the second electrode tab 127.

In an embodiment, an electrode pin 160 may be inserted from the first surface 132*a* of the cap plate 130. The electrode pin 160, in this embodiment, may be inserted into terminal through-holes 135, 141 and 151 that are defined in the cap plate 130, the insulating plate 140, and the terminal plate 150, respectively, and may be coupled to the terminal plate 150. In an embodiment where the terminal plate 150 is coupled to the second electrode tab 127 of the electrode assembly 120, the electrode pin 160 may, thus, also be electrically connected to the second electrode plate 122. Additionally, according to an embodiment, the first electrode tab 125 may be electrically connected to the cap plate 130.

A gasket 170 formed of an insulating material, for example the same material as the insulating plate 140, may insulate the electrode pin 160 from the cap plate 130, according to an embodiment.

Figure 6:
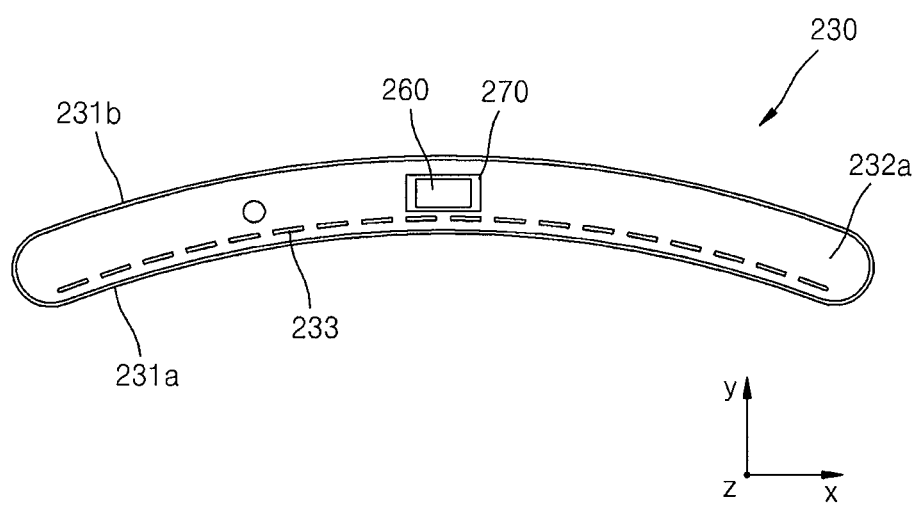
FIG. 6 is a plan view of a modified embodiment of a cap plate of the curved secondary battery of FIG. 1.

FIG. 6 is a plan view of a modified embodiment of a cap plate 230 of the curved secondary battery 10 of FIG. 1.

Referring to the embodiment shown in FIG. 6, the cap plate 230 may have a concave first side surface 231*a* and a convex second side surface 231*b* that are parallel to each other. The cap plate 230 in this embodiment may also have a first surface 232*a* and a second surface connecting the first side surface 231*a* and the second side surface 231*b*.

The first surface 232*a*, according to this embodiment may face an exterior of the curved secondary battery 10, and may include an electrode pin 260. A gasket 270 may be positioned between the electrode pin 260 and the cap plate 230, according to this embodiment.

In this embodiment, a first groove 233 may extend on the first surface 232*a* along a lengthwise direction of the cap plate 230. The first groove 233, in this embodiment, may be the same as the first groove 133 described with reference to FIGS. 1 through 5, that is, the first groove 233 may have the same curvature as the first and second side surfaces 231*a* and 231*b*, and may be positioned closer to the first side surface 231*a* than the second side surface 231*b*. Also, the first groove 233, in this embodiment, may be inset from the first side surface 231*a*, for example, about 0.25 mm to about 0.5 mm, and a thickness of the first groove 233 may be less than a thickness of the cap plate 230, for example, may be one third to one half its thickness.

The first groove 233, according to this embodiment, may be discontinuous or perforated such that the first groove 233 may include parts that have the same thickness as the cap plate 230. An overall hardness of the cap plate 230, in these embodiments, may be increased, and thus, the curved secondary battery 10 of FIG. 1, including the cap plate 230, may be manufactured safely. Because the cap plate 230, according to these embodiments, may safely withstand a reference external pressure, the cap plate 230 is likely only to be deformed when a pressure level within the curved secondary battery 10 exceeds the reference pressure level.

Figure 7:
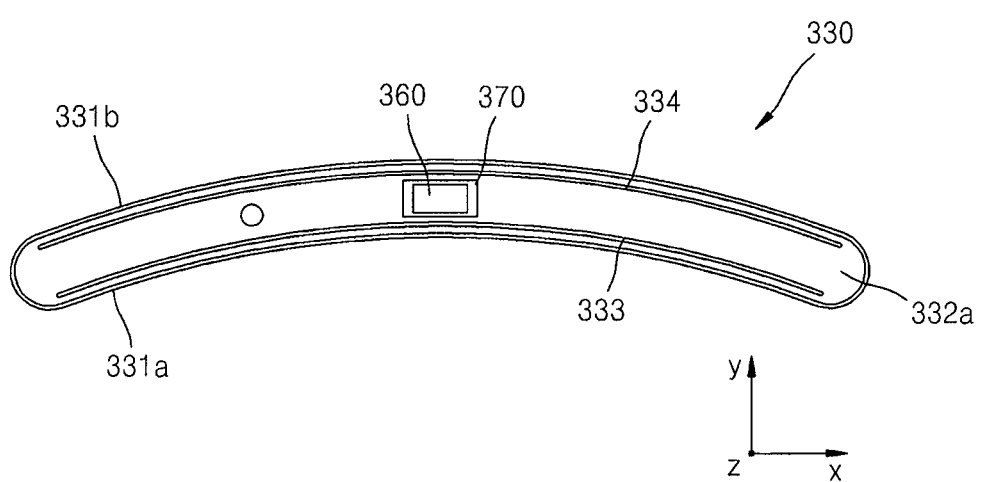
FIG. 7 is a plan view of another modified embodiment of a cap plate of the curved secondary battery of FIG. 1.

FIG. 7 is a plan view of another modified embodiment of a cap plate 330 of the curved secondary battery 10 of FIG. 1.

Referring to the embodiment shown in FIG. 7, the cap plate 330 may have a concave first side surface 331*a* and a convex second side surface 331*b* that are parallel to each other, and may also have a first surface 332*a* and a second surface connecting the first and second side surfaces 331*a* and 331*b*. The first surface 332*a*, according to an embodiment, may face an exterior of the secondary curved battery 10, and may include an electrode pin 360. A gasket 370 may be positioned between the electrode pin 360 and the cap plate 330, according to an embodiment. In this embodiment, a first groove 333 and a second groove 334 may extend along a lengthwise direction of the cap plate 330 on the first surface 332*a*.

The first groove 333, according to an embodiment, may be the same as the first groove 133 described with reference to FIGS. 1 through 5, that is, by including the first groove 333, the safety of the curved secondary battery 10 of FIG. 1 may be improved, and weldability of the can 110 of FIG. 1 to the cap plate 330 may be improved.

The second groove 334, according to this embodiment, may be positioned closer to the second side surface 331*b* than the first side surface 331*a*. For example, the second groove 334, according to an embodiment, may be inset from the second side surface 331*b*, for example, about 0.25 mm to about 0.5 mm and, a thickness of the second groove 334 may be less than a thickness of the cap plate 330, for example, one third to one half the thickness.

According to these embodiments, during manufacturing, as the second groove 334 is formed, deformation of the first and second grooves 333 and 334 may occur, and thus, safety of the curved secondary battery 10 of FIG. 1 may be further improved when an external impact is applied to the curved secondary battery 10 of FIG. 1. Also, the weldability of the cap plate 330 and the can 110 of FIG. 1 may be further improved according to these embodiments, and when a bent shape is formed by applying a pressure to the cap plate 330, a stress generated in the cap plate 330 may be effectively dispersed.

As described above, safety and manufacturing efficiency of a curved secondary battery 10 may be increased, according to the one or more of the above embodiments of the present invention.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention, and as defined by the following claims.

What is claimed is:

1. A curved secondary battery comprising:
    a can;
    an electrode assembly accommodated in the can; and
    a cap plate coupled to the can,
    wherein the cap plate comprises a concave first side surface and a parallel convex second side surface, and a first surface and a second surface that connect the first and second side surfaces,
    wherein the first surface comprises a first groove extending along a lengthwise direction of the cap plate between a first end portion and a second end portion, the first groove being positioned closer to the first side surface than to the second side surface,
    wherein each end portion of the first groove along the lengthwise direction of the cap plate comprises a slope part,
    wherein a depth of the first groove decreases at each end portion along the slope part in the lengthwise direction of the cap plate, and
    wherein the first surface is an exterior-facing surface and the second surface is an interior-facing surface, and wherein only the exterior-facing surface is grooved.

2. The curved secondary battery of claim 1, wherein the groove is parallel to the first side surface and the second side surface.

3. The curved secondary battery of claim 1, wherein the groove is inset approximately 0.25 millimeter to approximately 0.5 millimeter from the first side surface.

4. The curved secondary battery of claim 1, wherein a depth of the groove is approximately one third to one half of a distance between the first surface and the second surface.

5. The curved secondary battery of claim 1, wherein the groove is discontinuous.

6. The curved secondary battery of claim 1, wherein the first surface of the cap plate further comprises a second groove parallel to the first groove, and
    wherein the second groove is positioned closer to the second side surface than the first side surface.

7. The curved secondary battery of claim 1, wherein the cap plate further comprises
    an anchor protruding from the second surface toward the electrode assembly, and
    an insulating plate positioned at a bottom surface of the cap plate, the insulating plate defining an anchor groove configured to receive the anchor.

8. The curved secondary battery of claim 7, wherein the anchor groove is greater than a length of the anchor.

9. The curved secondary battery of claim 7, further comprising:
    a terminal plate positioned at a bottom surface of the insulating plate; and
    an electrode pin inserted from the first surface,
    wherein the electrode pin penetrates the cap plate and the insulating plate, and is coupled to the terminal plate.

10. A curved secondary battery comprising:
    a can;
    an electrode assembly accommodated in the can and comprising a first electrode plate, a second electrode plate, and a separator between the first electrode plate and the second electrode plate; and
    a cap plate coupled to the can,
    wherein the can has a curvature,
    wherein the cap plate comprises a concave first side surface and a convex second side surface having the same curvature as the can, and further comprises a first surface and a second surface connecting the first and second side surfaces,
    wherein the first surface is at an exterior surface of the cap plate and comprises a first groove extending along a lengthwise direction of the cap plate between a first end portion and a second end portion, the first groove being inset from the first side surface approximately 0.25 millimeter to approximately 0.5 millimeter,
    wherein each end portion of the first groove along the lengthwise direction of the cap plate comprises a slope part,
    wherein a depth of the first groove decreases at each end portion along the slope part in the lengthwise direction of the cap plate, and
    wherein the first surface is an exterior-facing surface and the second surface is an interior-facing surface, and wherein only the exterior-facing surface is grooved.

11. The curved secondary battery of claim 10, wherein a depth of the first groove is approximately one third to one half of a thickness of the cap plate.

12. The curved secondary battery of claim 10, wherein the first groove is discontinuous.

13. The curved secondary battery of claim 10, wherein the first surface of the cap plate further comprises a second groove parallel to the first groove, and
    wherein the second groove is inset approximately 0.25 millimeter to approximately 0.5 millimeter from the second side surface.

14. The curved secondary battery of claim 10, further comprising:
    an insulating plate and a terminal plate positioned at a bottom of the cap plate; and
    an electrode pin inserted from the first surface of the cap plate and coupled to the terminal plate by penetrating the cap plate and the insulating plate.

15. The curved secondary battery of claim 14, further comprising a first electrode tab coupled to the cap plate and a second electrode tab coupled to the terminal plate,
    wherein the first electrode tab is further coupled to the first electrode plate, and the second electrode tab is further coupled to the second electrode plate.

16. The curved secondary battery of claim 14, wherein the cap plate further comprises an anchor protruding from the second surface in a direction toward the electrode assembly, and
    wherein the insulating plate defines an anchor groove configured to receive the anchor.

17. The curved secondary battery of claim 16, wherein the anchor groove is larger than the anchor.

\* \* \* \* \*